(12) United States Patent
Bacha (10) Patent No.: US 10,909,210 B2
(45) Date of Patent: Feb. 2, 2021

(54) METHOD AND SYSTEM FOR DEFINING A WEB SITE DEVELOPMENT STRATEGY

(71) Applicant: OVH, Roubaix (FR)

(72) Inventor: Remi Bacha, La Madeleine (FR)

(73) Assignee: OVH, Roubaix (FR)

( * ) Notice: Subject to any disclaimer, the term of this patent is extended or adjusted under 35 U.S.C. 154(b) by 280 days.

(21) Appl. No.: 16/030,445

(22) Filed: Jul. 9, 2018

(65) Prior Publication Data

US 2019/0294698 A1    Sep. 26, 2019

(30) Foreign Application Priority Data

Mar. 22, 2018  (EP) .................................... 18315004

(51) Int. Cl.
*G06F 16/00*     (2019.01)
*G06F 16/958*    (2019.01)
*G06F 16/248*    (2019.01)
*G06F 16/9535*   (2019.01)
*G06F 16/2457*   (2019.01)

(52) U.S. Cl.
CPC .......... *G06F 16/958* (2019.01); *G06F 16/248* (2019.01); *G06F 16/24578* (2019.01); *G06F 16/9535* (2019.01)

(58) Field of Classification Search
CPC ............. G06F 16/24578; G06F 16/248; G06F 16/9535; G06F 16/958
USPC ................................................ 707/705–780
See application file for complete search history.

(56) References Cited

U.S. PATENT DOCUMENTS 6,370,582 B1   4/2002   Lim et al.
6,633,906 B1   10/2003  Callaway et al.
6,968,370 B2   11/2005  Wu
(Continued)

FOREIGN PATENT DOCUMENTS

JP   H06266666 A    9/1994
WO   2002/033553 A1 4/2002

OTHER PUBLICATIONS

Schwartz, "Google reaffirms 15% of searches are new, never been searched before", 2017, https://searchengineland.com/google-reaffirms-15-searches-new-never-searched-273786, pdf document, 4 pages.
(Continued)

*Primary Examiner* — Michelle N Owyang
(74) *Attorney, Agent, or Firm* — BCF LLP (57) ABSTRACT

A method and a server for defining a web site development strategy are disclosed. A query to a search analytics provider carries a main keyword defined for the web site. A response carries a list secondary keywords and a number of past search requests for each secondary keyword. Secondary queries are sent for each secondary keyword of the list and secondary responses carry additional lists of secondary keywords. A keyword dataset having an entry for each secondary keyword associated with its corresponding number of past search requests is stored. Hierarchical clusters are formed in the keyword dataset, each hierarchical cluster comprising a theme representing a group of analogous secondary keywords and a sum of past search requests for the group. A list of themes is output as a recommendation for populating the web site by creating a web page corresponding to each theme.

20 Claims, 7 Drawing Sheets

(56) References Cited

U.S. PATENT DOCUMENTS

| | | | |
|---|---|---|---|
| 7,693,813 B1* | 4/2010 | Cao | G06F 16/93 |
| | | | 707/999.001 |
| 8,849,812 B1* | 9/2014 | Mukherjee | G06F 16/958 |
| | | | 707/728 |
| 9,262,145 B2 | 2/2016 | Grimme et al. | |
| 9,589,053 B1* | 3/2017 | Augustine | G06F 16/951 |
| 9,792,629 B2 | 10/2017 | Rao et al. | |
| 10,089,387 B1* | 10/2018 | Hoyne | G06F 16/3344 |
| 10,685,044 B2* | 6/2020 | Miranda | G06F 16/2358 |
| 2003/0018539 A1 | 1/2003 | La Poutre et al. | |
| 2004/0236737 A1* | 11/2004 | Weissman | G06F 16/367 |
| 2005/0278723 A1 | 12/2005 | Feinleib et al. | |
| 2008/0196043 A1 | 8/2008 | Feinleib et al. | |
| 2009/0204910 A1* | 8/2009 | Zhang | G06F 16/951 |
| | | | 715/760 |
| 2009/0299998 A1* | 12/2009 | Kim | G06F 16/951 |
| 2010/0281173 A1 | 11/2010 | Vutukuri et al. | |
| 2012/0185466 A1* | 7/2012 | Yamasaki | G06F 16/3338 |
| | | | 707/722 |
| 2014/0012841 A1* | 1/2014 | Will | G06F 16/3338 |
| | | | 707/728 |
| 2014/0082602 A1 | 3/2014 | Mallur et al. | |
| 2016/0026720 A1* | 1/2016 | Lehrer | G06F 16/23 |
| | | | 707/710 |

OTHER PUBLICATIONS

Dick "Search engine optimisation in UK news production", Journalism Practice, 2011, vol. 5, No. 4, p.p. 462-477.

Giomelakis et al., "Employing search engine optimization techniques in online news articles. Studies in Media and Communication", 2015, vol. 3, No. 1, p.p. 22-33.

Giomelakis et al., "Investigating search engine optimization factors in media websites: the case of Greece", Digital Journalism, 2016, vol. 4, No. 3, p.p. 379-400.

Codina et al., "Search engine optimization and online journalism: the SEO-WCP framework", 2016, 21 pages.

"Running PowerShell commands from Linux", Aaron's Code Notes, retrieved on http://sharpcodenotes.blogspot.com/2014/01/running-powershell-commands-from-linux.html on Jul. 19, 2019, 2 pages.

Yunus, "Executing Powershell script on Win2012 R2 Server from Linux using SaltStack", retrieved on https://www.youtube.com/watch?v=miK25mDV9ik&feature=youtu.be on Jul. 19, 2019, 1 page.

"How can I connect to a Windows server using a Command Line Interface? (CLI)", ServerFault, retrieved on https://serverfault.com/questions/429426/how-can-i-connect-to-a-windows-server-using-a-command-line-interface-cli on Jul. 19, 2019, 6 pages.

Snover, "PowerShell is open sourced and is available on Linux", retrieved on https://azure.microsoft.com/en-us on Mar. 16, 2018, 6 pages.

Qasha, "Developing Multi-platform package for Remote System Administration", (IJCSIS) International Journal of Computer Science and Information Security, vol. 10, No. 3, 2012, p.p. 72-76.

"PowerShell Server", Software, retrieved on https://www.nsoftware.com/powershell/server/ on Mar. 16, 2018, 6 pages.

English Abstract for JPH06266666 retrieved on Espacenet on Jul. 19, 2019.

* cited by examiner

METHOD AND SYSTEM FOR DEFINING A WEB SITE DEVELOPMENT STRATEGY

CROSS-REFERENCE TO RELATED APPLICATION(S)

This United States Non-Provisional patent application relies for priority on European Patent Application Serial No. EP 18315004.4, filed on Mar. 22, 2018, the entire content of which is incorporated herein by reference.

FIELD

The present technology relates to systems and methods used to perform Internet searches. In particular, the systems and methods for defining a web site development strategy.

BACKGROUND

Search engines such as Google™, Bing™, Yahoo!™ and the like assign ranks to search request results and the owner of a web site will normally desire his/her web site to have the highest possible ranking. Search engine optimization (SEO) is a technique used to augment the visibility of a web site to users of search engines. SEO allows a web site to obtain high ranks in search results, in turn increasing the traffic generated on the web site with the ultimate goal of increasing revenues for the web site owner.

Proper optimization using SEO requires a lot of attention to the contents of a web site. Preparing a sound content strategy for a web site is a time-consuming task, usually requiring several days of work for a single site. This task may involve studying large numbers of search requests made by users, obtaining and postprocessing (e.g. cleaning) data from these search requests in order to populate the web site with keywords and other specific terms that are commonly used by users when specifying their search requests. A fundamental and concrete problem with manual preparation of a content strategy lies in the high rate of change of information in Internet web sites and of their referencing in search engines. For example, Google™ has recently stated that 15% of searches done on a daily basis have never been seen before. Information stored on web sites worldwide changes everyday. Search engines routinely scan through web sites all over the world on a continuous basis, using a process called web crawling. New web sites and new web pages are repetitively visited by web crawlers on a daily basis and new or modified keywords are constantly added in the databases of search engines. Web site owners using a manual approach to define their content strategy based on a collection of keywords are constantly running late and cannot possibly keep up with new keywords added everyday.

Search Analytics Providers, for example SEMrush™, facilitate SEO by providing databases of keywords selected by users for performing Internet searches. Keywords are grouped in clusters and information about traffic volume generated by use of those keywords is provided. Recent tools now suggest topics for new contents, the suggestions being based on keywords.

Currently, these techniques are limited in that they operate solely based on exact search terms and in that they do not account for data specific to given web sites. Web site owners must still process manually the information received from search analytics providers to parse the information, use their professional judgment to define synonyms for the keywords found in the information, delete information that is not relevant to their web sites, and the like. It is not humanly possible to go through spreadsheets containing hundreds of thousands of distinct entries provided by search analytics providers at a rate permitting the timely formation of a useful representation of Internet contents relevant to the needs of a web site owner. In summary, current techniques cannot react with sufficient speed to continuous changes in the contents of the Internet and in lists of keywords stored in search engine databases.

Even though the recent developments identified above may provide benefits, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise current limitations of search engine optimization (SEO) techniques that can solely operate on the basis of exact terms used by Internet users accessing search engines and that cannot account for the needs of web site owners desiring to tailor keyword management according to the specific needs of their web sites.

In one aspect, various implementations of the present technology provide a method for defining a web site development strategy, the method comprising:
  defining, at a user interface of a server, a main keyword for the web site;
  storing the main keyword in a memory of the server;
  sending a query, from the server to a search analytics provider, the query carrying the main keyword;
  receiving, at the server from the search analytics provider, a first response carrying a first plurality of secondary keywords and a corresponding number of past search requests for each secondary keyword;
  for each given keyword of the first plurality of secondary keywords:
    sending a secondary query, from the server to the search analytics provider, the secondary query carrying the given keyword, and
    receiving, at the server from the search analytics provider, a secondary response carrying a second plurality of secondary keywords and a corresponding number of past search requests for each secondary keyword;
  storing a keyword dataset in the memory of the server, each entry of the keyword dataset comprising a distinct secondary keyword associated with its corresponding number of past search requests;
  at the server, forming hierarchical clusters in the keyword dataset, each hierarchical cluster comprising:
    a theme representing a group of analogous secondary keywords, and
    a sum of the numbers of past search requests corresponding to the secondary keywords of the group; and outputting, on the user interface of the server, a list of the themes as a recommendation for populating the web site by creating a web page corresponding to each theme.

In other aspects, various implementations of the present technology provide a server, comprising:
   a communication module adapted for communicating with other network nodes over the Internet;
   a user interface
   a memory; and
   a processor operatively connected to the communication module, to the user interface, and to the memory, the processor being adapted for:
      receiving, via the user interface, a main keyword for the web site;
      storing, in the memory, the main keyword for the web site;
      causing the communication module to send a query server to a search analytics provider, the query carrying the main keyword;
      receiving, from the search analytics provider via the communication module, a first response carrying a first plurality of secondary keywords and a corresponding number of past search requests for each secondary keyword;
      for each given keyword of the first plurality of secondary keywords:
         causing the communication module to send a secondary query to the search analytics provider, the secondary query carrying the given keyword, and
         receiving, from the search analytics provider via the communication module, a secondary response carrying a second plurality of secondary keywords and a corresponding number of past search requests for each secondary keyword;
      storing a keyword dataset in the memory, each entry of the keyword dataset comprising a distinct secondary keyword associated with its corresponding number of past search requests;
      forming hierarchical clusters in the keyword dataset, each hierarchical cluster comprising:
         a theme representing a group of analogous secondary keywords, and a sum of the numbers of past search requests corresponding to the secondary keywords of the group;
      storing the hierarchical clusters in the keyword dataset; and
      causing the user interface to output a list of the themes as a recommendation for populating the web site by creating a web page corresponding to each theme.

In other aspects, various implementations of the present technology provide a server, comprising:
   a communication module adapted for communicating with a search analytics provider and with a search engine over the Internet;
   a user interface;
   a processor operatively connected to the communication module and to the user interface; and
   a memory, the memory being adapted for storing a keyword dataset, the memory further comprising a non-transitory computer-readable medium storing executable code thereon, the executable code comprising instructions for executing the method for defining a web site development strategy when the executable code runs on the processor.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In the context of a commercial web site, for example but without limitation in cases where the web site is configured for performing commercial transactions through so-called online purchases, increasing traffic to the web site tends to naturally increase the income for the owner of the web site. To increase traffic to the web site, web site owners routinely define new pages that are discovered by search engines. Web site owners also add, on pages of their web sites, keywords that are frequently used by users searching on the Internet. Of course, web site owners will personalize their design by selecting keywords that match the actual products and/or services offered on the web site. Creation of new web site pages using the most relevant keywords improves the likelihood that Internet searches will lead potential clients to reach the web site.

In the non-limiting example of a company selling computer servers or selling (or renting) space on computer servers, useful and often-used keywords may include terms such as "server", "hosting", "data center", "cloud", "storage", "archive", as well as trademark names of cloud service providers, for example "OVH™".

The present disclosure introduces a technology aiming at automating a content strategy for a web site. Some aspects of this technology include an automated analysis of Internet search requests, automatic definition of a list of suggested pages to be created for the web site, and a calculation of a potential business income for the web site. Some embodiments of the present technology may include all of those aspects while some other embodiments may include a subset of those aspects.

Defining a web site development strategy may therefore start with gathering a list of useful keywords used for Internet searches by potential clients of the web site owner. The web site owner defines a main keyword that generally identifies a product or a service sold or advertised on the web site. Keywords that are analogous to the main keyword in the sense that they bear the same or similar meanings or that they relate to the same or similar concepts, are called secondary keywords and are automatically collected. The main keyword and the secondary keywords may each actually consist of a single word or of a plurality of words. Frequently used keywords having a common meaning are grouped into clusters. For example, the keywords "host", "hosting", "hosted", "web hosting service", "Internet hosting", and the like may form part of a same cluster, the term "host" being common to all keywords in that cluster. The present technology may include, in that cluster, terms such as synonyms having equivalent meanings, event though they may be spelled differently. For example, the expression "data server space for rent" may become part of the cluster for "host" even though there is no a priori commonality between this expression and the term "host". In contrast with early search engine optimization (SEO) techniques, the present technology allows obtaining, as a response to a single query, large lists of keywords that contain at once thousands of corresponding keywords (i.e. secondary keywords that include the keyword sent in the query) and thousands of related keywords (i.e. secondary keywords having a similar meaning to that sent in the query, for example synonyms). The present technology thus offers improvements in the technical field of search engine optimization.

When a practical number of clusters is formed, a suggestion is made for creating a web page for each cluster. The creation of new pages and the insertion therein of useful and commonly used keywords is an efficient manner of attracting traffic on a web site. No manual implementation of a content strategy could ever follow-up with the high rate of change of information in Internet web sites and of their referencing in search engines, which change on a daily basis. Using the present technology, the content strategy for a web site can be prepared in a few minutes rather than as a result of a few days of work. The fundamental deficiency of current server technology that cannot follow-up with rapid changes in the contents of the Internet, even with the help of SEO techniques, is concretely overcome by the present automatic gathering and processing of keywords entered by users searching over the Internet.

With these fundamentals in place, we will now consider some non-limiting examples to illustrate various implementations of aspects of the present technology.

Figure 1:
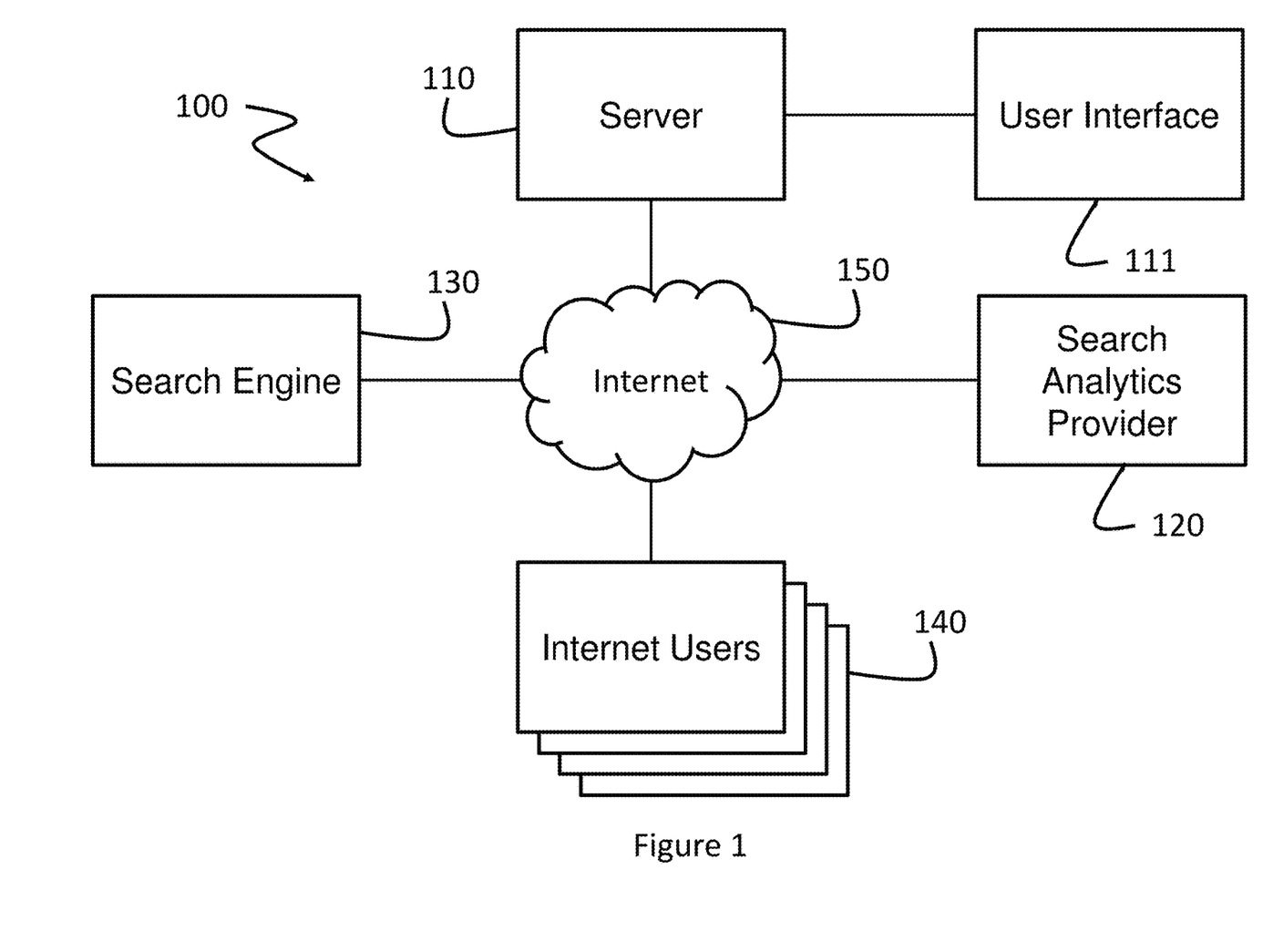
FIG. 1 illustrates a network in accordance with an embodiment of the present technology.

FIG. 1 illustrates a network 100 in accordance with an embodiment of the present technology. The network 100 includes a server 110 for a web site, a user interface 111 including for example a computer display and a mouse, a touch sensitive display, and the like, allowing a web site owner to enter information into the server 110 and to receive information from the server 110, a search analytics provider 120, a search engine 130 and a plurality of Internet users 140, all of which are connected via the Internet 150. The server 110, the search analytics provider 100, the search engine 130 and the Internet users 140 may all communicate via the Internet 150. The network 100 may include a plurality of servers such as the server 110; however, the description of the present technology will focus on improvements made in the server 110 and on the needs of a particular web site implemented in the server 110. The network may include a plurality of search engines and a plurality of search analytics provider. A single search analytics provider 120 and a single search engine 130 are illustrated for simplicity purposes and without limiting the generality of the present technology.

Figure 2:
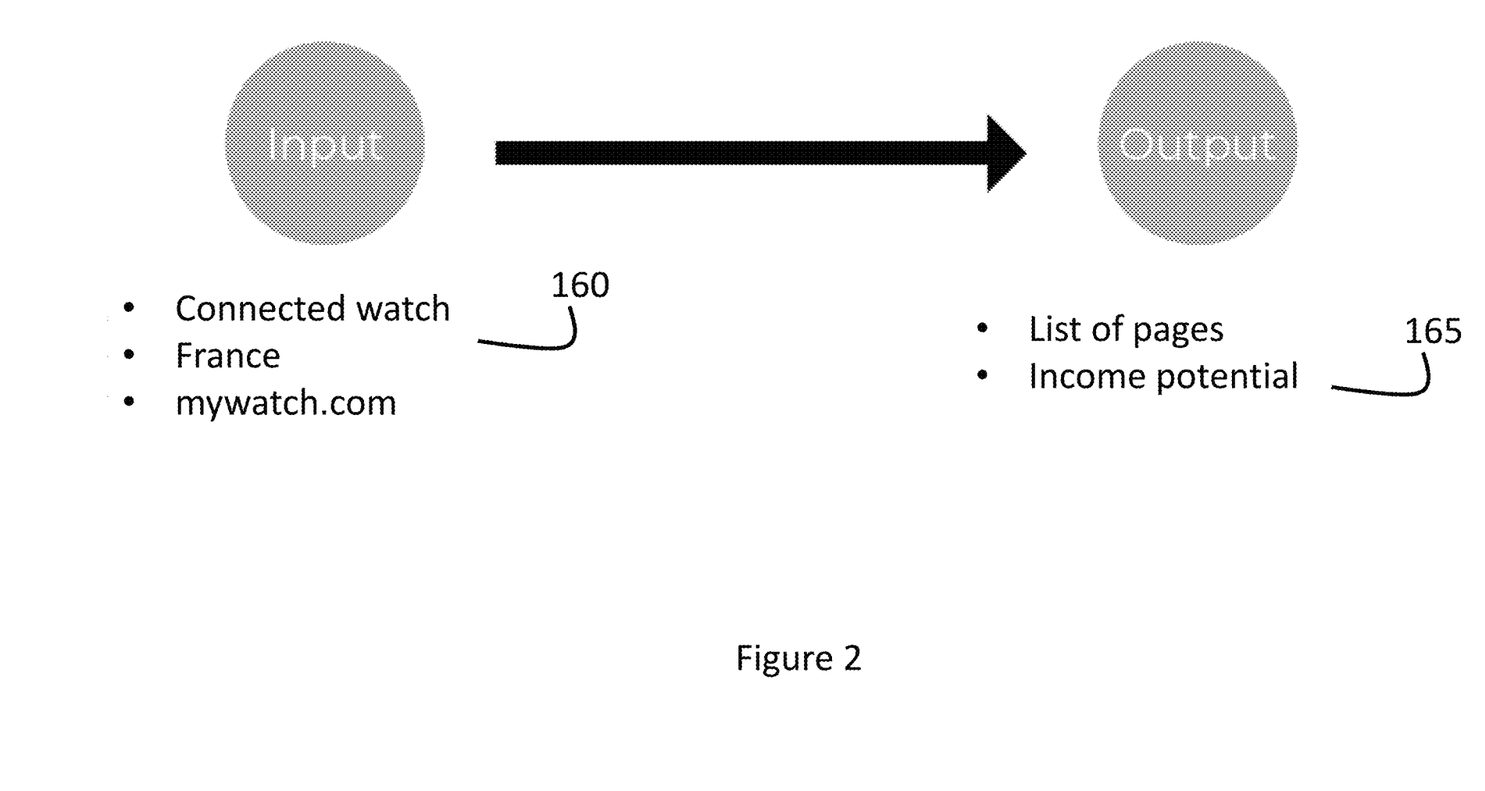
FIG. 2 is a simplified diagram illustrating an input provided to the server 110 by a web site owner and an expected output in accordance with an embodiment of the present technology.

FIG. 2 is a simplified diagram illustrating an input provided to the server 110 by a web site owner and an expected output in accordance with an embodiment of the present technology. FIG. 2 introduces a non-limiting example in which the web site sells connected watches and may be reached at an address "mywatch.com". This web site is hosted in France. The term "connected watch" that designates the product to be sold is selected as a main keyword. The web site owner may optionally desire to focus the applicability of the web site to France. The web site owner enters these information elements, via the user interface 111, as an input 160 into the server 110 and expects obtaining, as an output 165 from the server 110, a list of pages to be created and an evaluation of a business income potential for each pages of the list, the output 165 being presented on the user interface 111.

Figure 3:
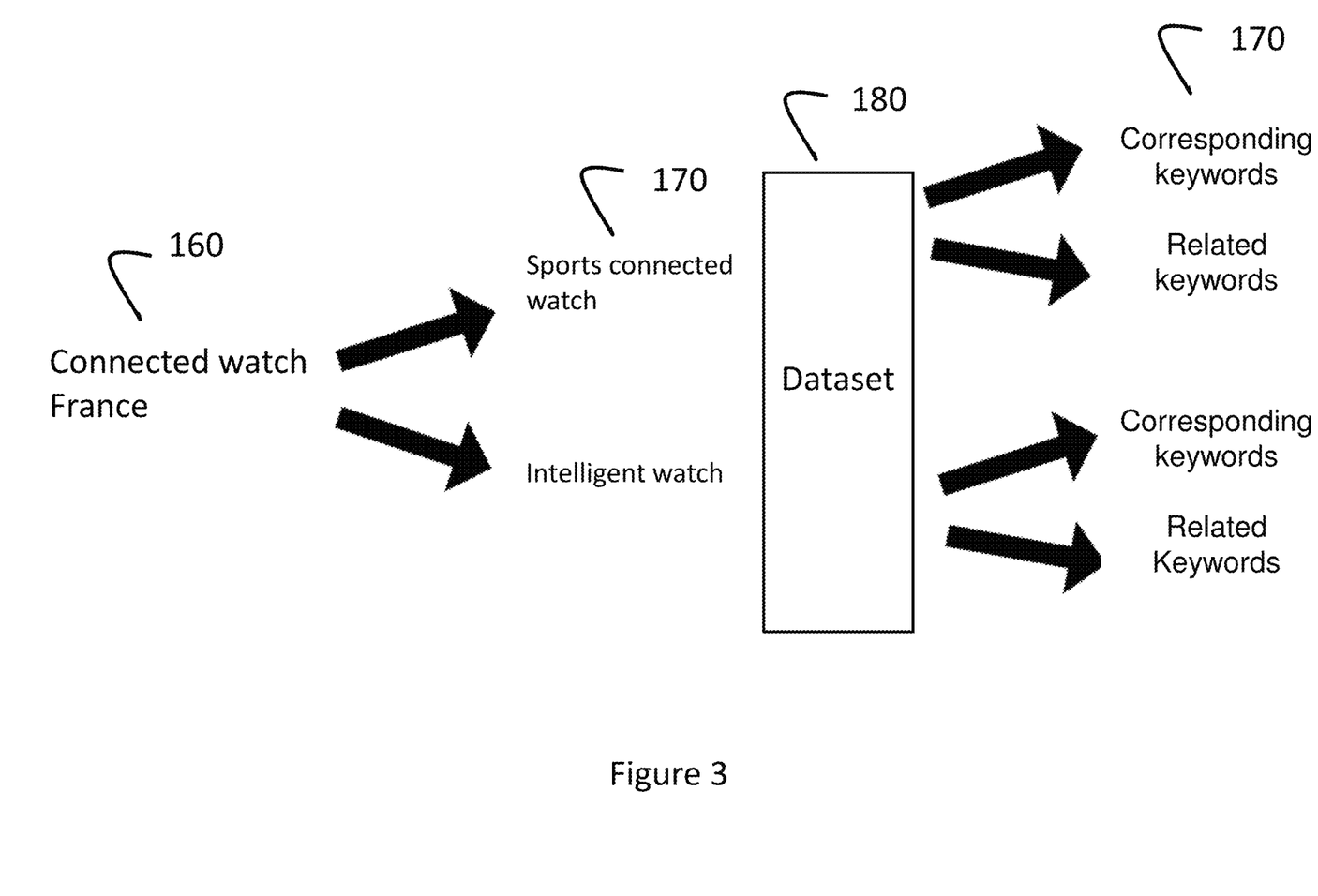
FIG. 3 is a simplified diagram showing principles of a method for accumulating secondary keywords corresponding to a main keyword in accordance with an embodiment of the present technology.

FIG. 3 is a simplified diagram showing principles of a method for accumulating secondary keywords corresponding to a main keyword in accordance with an embodiment of the present technology. The information elements forming the input 160 are sent in a first request from the server 110 to the search analytics provider 130 that returns a first response with a list of secondary keywords 170 that, in the example of FIG. 3, include two (2) secondary keywords 170, namely "sports connected watch" and "intelligent watch". In practice, a larger number of secondary keywords 170 may be received; only two (2) secondary keywords 170 are shown for ease of illustration. A number of patch search requests made on the Internet 150 is provided by the search analytics provider 130 for each of the secondary keywords 170. These numbers may relate to past search requests made over a given period of time, for example over the past month and/or over a given jurisdiction, for example over a country or a state. In the example of FIG. 3, the numbers may relate to past search requests originating from France. Some of the secondary keywords 170 may be labelled as "corresponding keywords" when they include the terms sent in the request. For example, "sports connected watch" is a corresponding keyword of "connected watch". Some other secondary keywords 170 may be labelled as "related keywords" when they include synonyms of the terms sent in the request. For example, "intelligent watch" is a related keyword" of "connected watch". In a typical example, the first response from the search analytics provider 130 may include thousands of corresponding keywords and thousands of related keywords. Regardless, these secondary keywords 170 are stored along with the corresponding numbers of past search requests as entries in a keyword dataset 180. The server 110 sends further requests to the search analytics provider 130, each such request carrying each one of the secondary keywords 170. In this process, thousands of further requests may be sent by the server 110, i.e. one such further request for each secondary keyword received in the first response from the search analytics provider 130. The search analytics provider 130 sends to the server 110 thousands of responses, each response potentially carrying thousands of additional secondary keywords 170 along with corresponding numbers of past search requests. All of keywords received at the server 110 from the search analytics provider 130 are inserted as further entries in the keyword dataset 180.

TABLE I

| Order | Keyword | Number of past searches |
|---|---|---|
| 1 | Smart connected watch | 13500 |
| 2 | Sports connected watch | 22200 |
| 3 | Intelligent watch | 22100 |
| 4 | Samsung connected watch | 18100 |
| 5 | Fitbit watch | 18100 |
| 6 | Apple watch | 9900 |
| 7 | Fossil connected watch | 6700 |

Some of the entries in the keyword dataset 180 may be deleted. For example, a same keyword may be found in more than one entry so duplicate entries may be deleted. The web site owner may have entered a list of unwanted terms in a memory of the server 110. Non-limiting examples of unwanted terms may comprise a list of competitors of the web site owner. The entries of the keyword dataset 180 having one or more unwanted terms may be deleted or modified to remove the unwanted terms. It is noted that names of competitors have not been deleted in the example of Table I. Another reason for deleting entries includes the presence of irrelevant homonyms. In the present example, the term "watch" being part of the main keyword, a number of secondary keywords 170 in the keyword dataset 180 may be entirely irrelevant to any "connected watch". For example, an entry of the keyword dataset 180 may relate to "watching television", "watching a movie'" "watching a game", and the like. These entries may be located by placing terms such as "game", "television" and "movie" in the unwanted list. These entries may be manually deleted by the web site owner. Use of artificial intelligence to locate entries of the keyword dataset 180 that are not relevant to the business interests of the web site owner is also contemplated.

The entries of the keyword dataset 180, with or without steps deleting entries as described in the above paragraphs, are processed for forming clusters. To this end, spaces, grammatical articles (e.g. "a", "an", "the", etc.), stop words (e.g. "any", "few", "have", etc.) and punctuation marks may be deleted. For languages other than English, other examples of grammatical articles and stop words may be deleted as well. Also for languages other than English, letters having diacritical marks (e.g. é, ö, á) may be replaced with corresponding unmarked letters. Words in the plural form may be replaced with their singular equivalent. In languages where this is applicable, conjugated verbs may be changed to their infinite form and grammatical gender of words may be removed. Numbers expressed in ordinal form may be deleted. Misspelled words may be replaced with correctly spelled words. Other forms of stemming may be applied to the entries of the keyword dataset 180, as applicable in various languages. The present technology is not limited to languages using the Latin alphabet but is also applicable to languages using Asian characters, Cyrillic script, Arabic alphabet, and the like.

Once the entries have been cleaned of unwanted characters and of unwanted word forms, the entries are grouped to form themes that are intended to be added to new or existing pages of the web site. These themes are expected to be discovered by the search engine 130 when the search engine 130 performs its web crawling operations on the web site. Theses themes being analogous in their meanings to keywords used by Internet users 140 interested in the objects of the web site (the objects being designated by the main keyword, i.e. "connected watch" in the present example), their discovery by the search engine 130 is expected to lead the search engine 130 to direct traffic from the Internet users 140 to the web site hosted by the server 110. This is achieved by extracting the main keyword from each secondary keyword 170, as shown for example in Table II.

TABLE II

| Rank | Keyword | Number of past searches | Theme |
|---|---|---|---|
| 1 | Smart connected watch | 13500 | Smart |
| 2 | Sports connected watch | 22200 | Sport |
| 3 | Best intelligent watch | 22100 | Best intelligent |
| 4 | Samsung connected watch | 18100 | Samsung |
| 5 | Fitbit watch | 18100 | Fitbit |
| 6 | Apple watch | 9900 | Apple |
| 7 | Fossil connected watch | 6700 | Fossil |

In more details, in the present example, the main keyword is "connected watch". In Table II, the keyword "smart connected smart" is modified by removing the words "connected" and "watch", resulting in the word "smart" forming a theme. The keyword "best intelligent watch" is modified by removing the word "watch" to form a theme "best intelligent".

Figure 4:
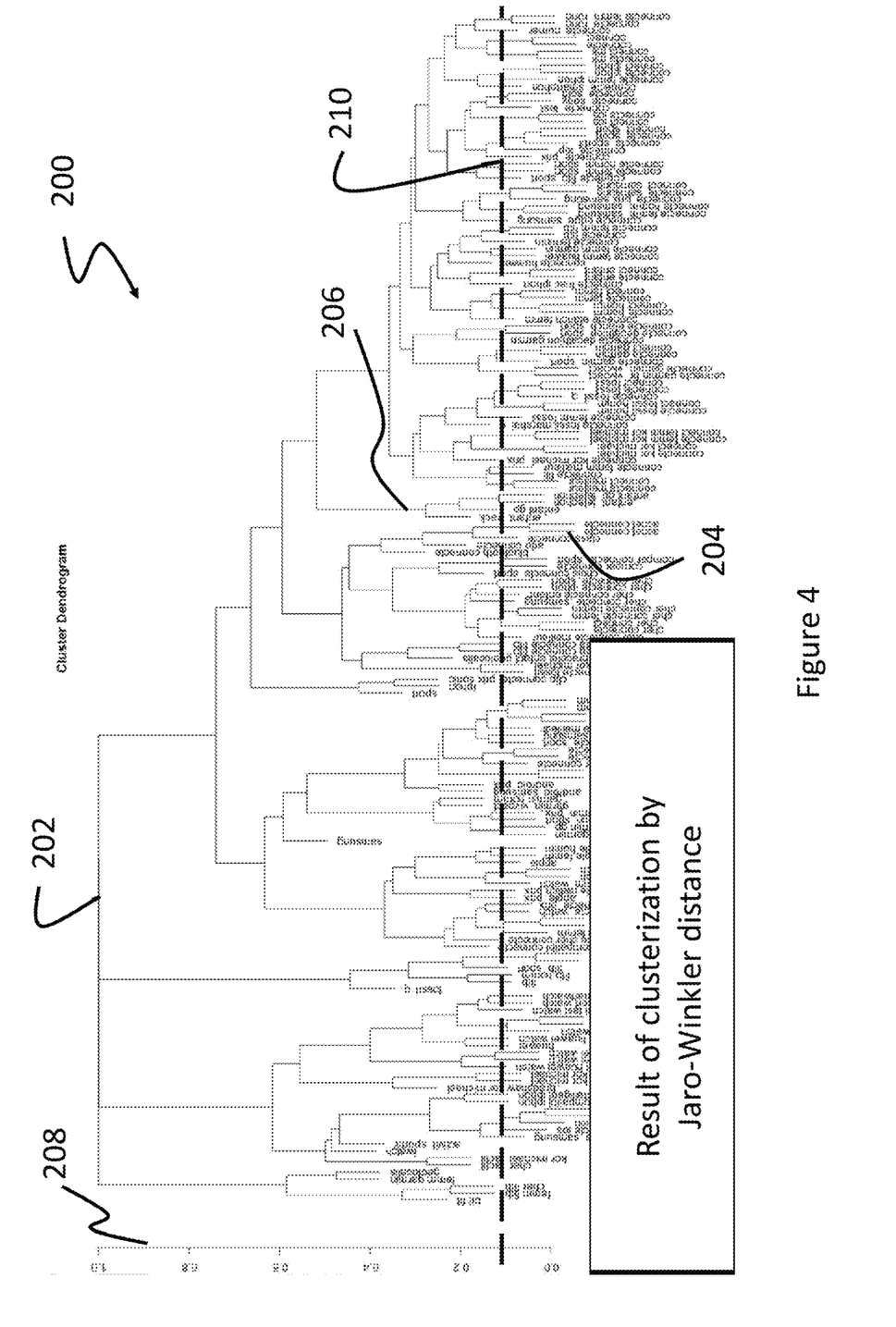
FIG. 4 is an illustrative example of a cluster dendogram obtained by clusterization of the contents of a keyword dataset in accordance with an embodiment of the present technology.

Once themes have been defined, the entries of the keyword dataset 180 are grouped into clusters. As mentioned hereinabove, the keyword dataset 180 may include a very large number of entries, for example tens of thousands of entries. Manually sorting the keyword dataset 180 would require an enormous amount of manpower, assuming it would even be possible. In an embodiment, the Jaro-Winkler algorithm is used to calculate a distance between the various themes in order to form groups (i.e. clusters) of proximate themes. The Jaro-Winkler algorithm is particularly effective in calculating distances between short terms, for example between acronyms that are oftentimes used as search terms by Internet users 140. FIG. 4 is an illustrative example of a cluster dendogram 200 obtained by clusterization of the contents of the keyword dataset 180 in accordance with an embodiment of the present technology. In an embodiment, the cluster dendogram 200 is not provided to the web site owner as an output of the server 110, the cluster dendogram 200 being mainly used to illustrate clusterization process. In fact, the web site owner does not need to view the cluster dendogram 200. The cluster dendogram 200 may remain as an abstraction useful to illustrate the clusterization process. An option of presenting the dendogram 200 to the web site owner is also contemplated.

A top line 202 of the cluster dendogram 200 represents the main keyword, i.e. "connected watch" in the present example. The themes as shown on Table II form a large number of leaves such as 204 at the bottom of the cluster dendogram 200. Each leaf 204 corresponds to one of the themes of Table II. Several leaves 204 that are proximate to one another are connected in links such as 206. A vertical axis 208 of the cluster dendogram 200 shows a ratio (or a percentage) of the cumulative number of past searches for the entire keyword dataset 180 corresponding to each part of the cluster dendogram 200. A distance along the vertical axis 208 between each leaf 204 and the top line 202 is inversely proportional to the number of past search requests for the theme represented by the leaf 204. It is noted that the theme is obtained by removing the main keyword from a secondary keyword 170, so the number of past search requests for a secondary keyword 170 corresponds to the number of past search requests for the theme. The entire content (100%) of the keyword dataset 180 is encompassed by the main keyword at the top line 202. About 75% of the content of the keyword dataset 180 is defined by four (4) topmost links of the keyword dataset 180.

The cluster dendogram 200 may comprise a very large number of leaves 204 so creating a new web page for each leaf 204 would be excessive in most applications. The web site owner defines a threshold value 210, for example 0.1 (10%) that relates to a maximal distance between the leaves of the tree and the main keyword for all entries of the keyword dataset 180. 90% of the sum of the numbers of past search requests for all entries are included in leaves 204 positioned at or above the threshold value 210 and in links 206 that intersect the threshold value 210. All leaves 204 positioned underneath the threshold value 210 are regrouped at the level where their links 206 intersect the threshold value 210. A cluster is formed in the keyword dataset 180 for each leaf 204 positioned above the threshold value 210 and for each link 206 that intersects the threshold value 210. Each cluster includes a theme representing one or more analogous secondary keywords 170 and a sum of the numbers of past search requests corresponding to the secondary keywords 170 of the group. For a given leaf 204 positioned at or above the threshold value 210, the theme of the cluster is the theme of that leaf 204. Leaves 204 positioned below the threshold value 210 are regrouped by the clusterization process at the level where their links 206 meet the threshold value 210. Generally speaking, leaves 204 that connect to a same link 206 include similar themes. To illustrate, the theme of a given leaf 204 may be "man watch leather bracelet" and the theme of another proximate leaf 204 be "woman watch leather bracelet", these leaves 204 being positioned immediately below the threshold value 210. The link 206 for these themes intersect the threshold value 210 and becomes a cluster associated to a compounded theme, which in this case may be "watch leather bracelet" and which becomes the theme for that cluster. Hierarchical clusters are formed by selecting leaves of the tree that are closer to the main keyword than the fraction of the maximal distance and by selecting links of the tree that intersect the fraction of the maximal distance.

Table III shows an example result of the hierarchical clusterization. The examples of Table III do not necessarily match those of Table II. Given a threshold value 210 selected in this example, there four (4) hierarchical clusters are obtained in the present example.

TABLE III

| Rank | Theme | Number of past searches | Number of keywords |
|---|---|---|---|
| 1 | Connected watch | 14356 | 3 |
| 2 | Intelligent watch | 9855 | 5 |
| 3 | Apple watch | 7845 | 2 |
| 4 | Best watch | 3489 | 7 |

Table III shows a number of secondary keywords 170 having been grouped in a common theme for a hierarchical cluster. The number of past searches for each theme is a combination of the numbers of past searches for the secondary keywords 170 that have been grouped into the hierarchical cluster. It may be observed that the server 110 is fundamentally modified by the above-described improvements allowing to rapidly collect and process keywords entered on the search engine 130 by Internet users 140 and to group those keywords into hierarchical clusters, these processes being performed by the server 110 at speeds that can keep-up with everyday additions of new keywords by Internet users 140.

Having produced the contents of Table III, the server 110 may, in an embodiment, issue the output 165 of FIG. 2 containing the list of hierarchical clusters as a list of pages to be added to the web site.

However, in another embodiment, the server 110 may enrich the output 165 by providing further information, in order to personalize the results based on the needs of the web site owner. In one aspect, the web site hosted at the server 110 may already contain a page corresponding to one of the hierarchical cluster, a new page not needing to be created. In another aspect, an evaluation of an income potential for each page to be added to the web site may be provided.

To this end, for each hierarchical cluster (i.e. for each row of the Table III, other than the title row), the server 110 may send a query to the search engine 130, the query requesting a list of all keywords that point to the web site at the search engine 130. The search engine 130 sends a response to the server 110, the response carrying the requested list of keywords along with key performance indicators (KPI) for each keyword. The KPIs for each keyword include, for example, a rank given by the search engine 130 to the web site hosted by the server 110 (i.e. an average position on search result pages provided by the search engine 130 to Internet users 140 who specify that keyword in their search requests) and a click through rate. A null rank is given by the search engine 130 when the theme is not found on any web page of the web site.

For each hierarchical cluster, the theme, the corresponding number of keywords and number of past searches from Table III are placed in columns of a Table IV, along with a column for the rank received as a KPI from the search engine 130. In Table IV, the number of past searches is now labelled "search traffic volume". Entries in a Page Type column are filled with data having relevance to the nature of the corresponding theme, this nature being for example "informative" or "commercial". This column may be filled by comparing the theme of a given hierarchical cluster with a lexicon of terms, stored in the memory of the server 110, using for example a determination of a distance between terms of the theme and terms in the lexicon. The Page Type column may alternatively be filled manually by the web site owner or automatically on the basis of an analysis of the theme, for example using artificial intelligence. Entries in the Comment column may be filled automatically, based on the rank for each theme. A good rank (low numerical value) may be identified, for example, as "Top 3 for the search engine". A poor rank (high numerical value) may be identified as not being visible on a search result page provided by the search engine 130. A null rank indicates that no page of the web site includes the theme, so a new page should be created.

Other columns of Table IV are also filled automatically. The Visits per Month and Visits per Year columns provide expected numbers of visits from Internet users 140 to pages of the web site that cite the various themes. The expected number of Visits per Month is calculated by multiplying the search traffic volume (per month) for a theme times the click through rate for that theme; that result is multiplied by 12 to fill the Visits per Year column.

The web site owner knows or estimates that a given percentage of users visiting an informative page, for example 0.02 percent, purchase a product costing, for example 200 Euros and that another percentage of users visiting a commercial page, for example 0.05 percent, purchase the product. An expected yearly business income is obtained by multiplying the number of visits per year and the relevant percentage times the purchase price of the product. The expected business income may be provided on a daily, weekly, monthly, quarterly or yearly basis. Rather than providing the expected business income in terms of Euros or another currency, the expected business income may be provided in other formats, for example as a number of units sold per period. Values shown in the expected business income column may be normalized, for example in a range of zero (0) to one (1) or in any other convenient range.

TABLE IV

| Theme | Number of Keywords | Rank | Search Traffic Volume | Page Type | Comment | Visits per Month | Visits per Year | Expected Business Income |
|---|---|---|---|---|---|---|---|---|
| Connected watch | 3 | 3 | 14356 | Informative | Top 3 for the search engine | 2220 | 26640 | 1066 |
| Intelligent | 5 | 2 | 9855 | Informative | Top 3 for the | 1735 | 20820 | 833 |

TABLE IV-continued

| Theme | Number of Keywords | Rank | Search Traffic Volume | Page Type | Comment | Visits per Month | Visits per Year | Expected Business Income |
|---|---|---|---|---|---|---|---|---|
| watch | | | | | search engine | | | |
| Apple watch | 2 | Null | 7845 | Commercial | Page to be created | 980 | 11760 | 1176 |
| Best watch | 7 | 25 | 3489 | Commercial | Not visible on search result page | 745 | 8940 | 894 |

The whole or a part of the contents of Table IV, for example the search traffic volume and the rank, may be made part of the output 165 provided to the web site owner by the server 110. In the example of Table IV, the web site owner may prioritize creating a page with the theme "Apple watch", considering that this new page is the one associated with the highest expected business income.

In at least one embodiment, the output 165 may contain additional information, for example a list of all secondary keywords 170 represented by the theme of a given hierarchical cluster, the additional information being provided as a recommended content a web page.

In an embodiment, all operations described in the above paragraphs may be repeated on a regular basis, for example daily or weekly, in order to account for the rapid changes of information found in the Internet 150 and for the rapid changes in the keywords used to perform searches by Internet users 140.

Figure 5:
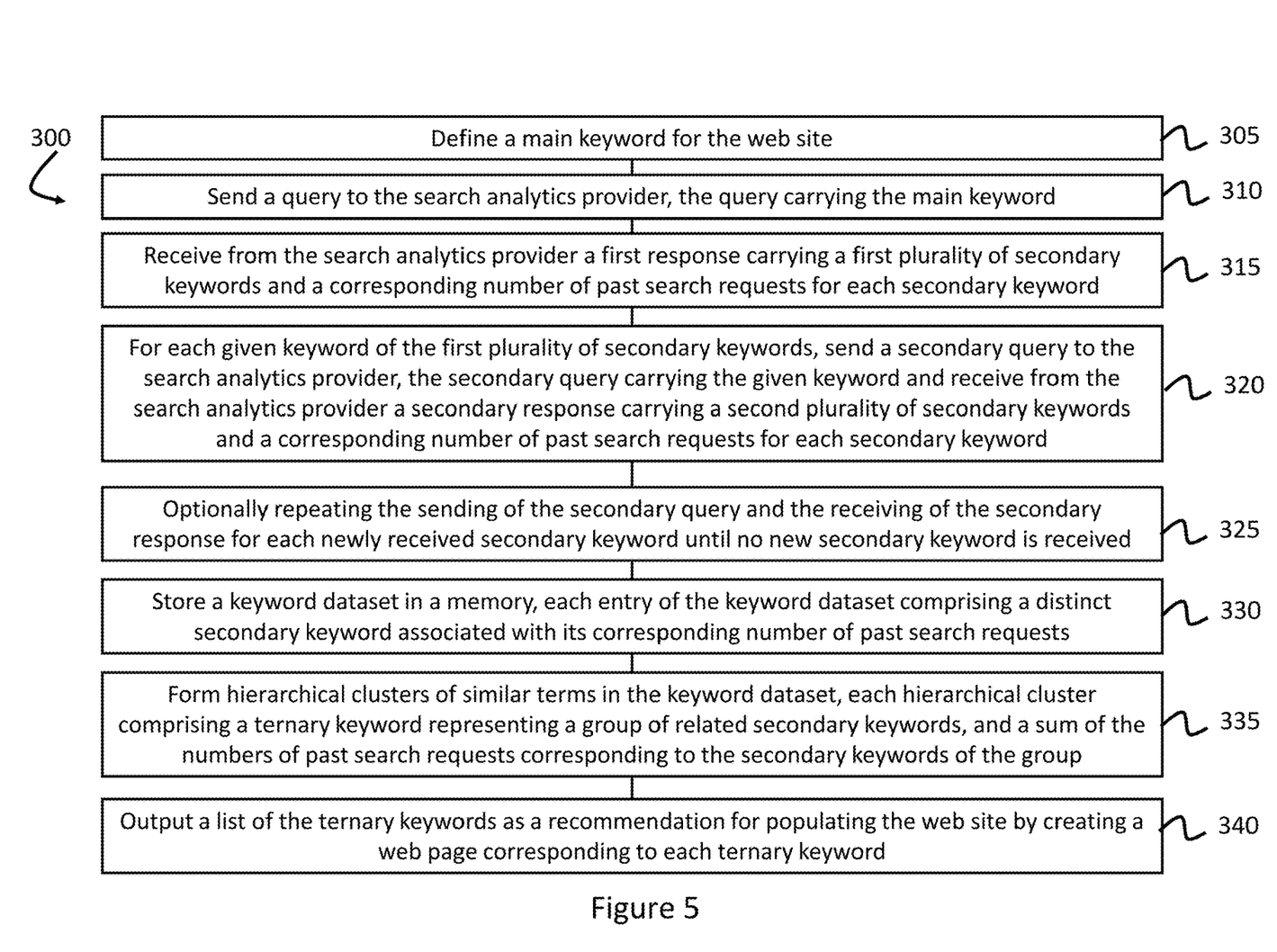
FIG. 5 is a sequence diagram showing operations of a method for defining a web site development strategy according to an embodiment in accordance with an embodiment of the present technology.

FIG. 5 is a sequence diagram showing operations of a method for defining a web site development strategy in accordance with an embodiment of the present technology. A sequence 300 comprises a plurality of operations that may be executed in variable order, some of the operations possibly being executed concurrently, some of the operations being optional. The sequence 300 is implemented in the server 110 and describes a specific implementation of a solution to the technical problem of collecting and processing keywords used by the Internet users 140, including keywords having similar meanings such as synonyms, with sufficient speed, accuracy and breath to cater for the rapid changes of those keywords over the Internet 150. The sequence 300 starts with operation 305 comprising defining a main keyword for the web site. A query is sent to a search analytics provider at operation 310, the query carrying the main keyword. A first response carrying a first plurality of secondary keywords and a corresponding number of past search requests for each secondary keyword is received from the search analytics provider at operation 315. For each given keyword of the first plurality of secondary keywords, operation 320 comprises sending a secondary query to the search analytics provider, the secondary query carrying the given keyword and receiving from the search analytics provider a secondary response carrying a second plurality of secondary keywords and a corresponding number of past search requests for each secondary keyword. Optionally, the sending of the secondary query and the receiving of the secondary response for each newly received secondary keyword may be repeated in a loop at operation 325 until no new secondary keyword is received. In a variant, the sending of the secondary query and the receiving of the secondary response may be repeated a predetermined number of times.

At operation 330, a keyword dataset is stored in a memory of the server 110, each entry of the keyword dataset comprising a distinct secondary keyword associated with its corresponding number of past search requests. The operation 330 may be distributed over time as the sequence 300 progresses, for example entries being stored in the keyword dataset each time a response from the search analytics provider carries at least one new secondary keyword. Hierarchical clusters of analogous keywords in the keyword dataset 180 are formed at operation 335. Each hierarchical cluster comprises a theme representing a group of analogous secondary keywords, and a sum of the numbers of past search requests corresponding to the secondary keywords of the group. Then, a list of the themes is outputted at operation 340, as a recommendation for populating the web site by creating a web page corresponding to each theme.

Figure 6:
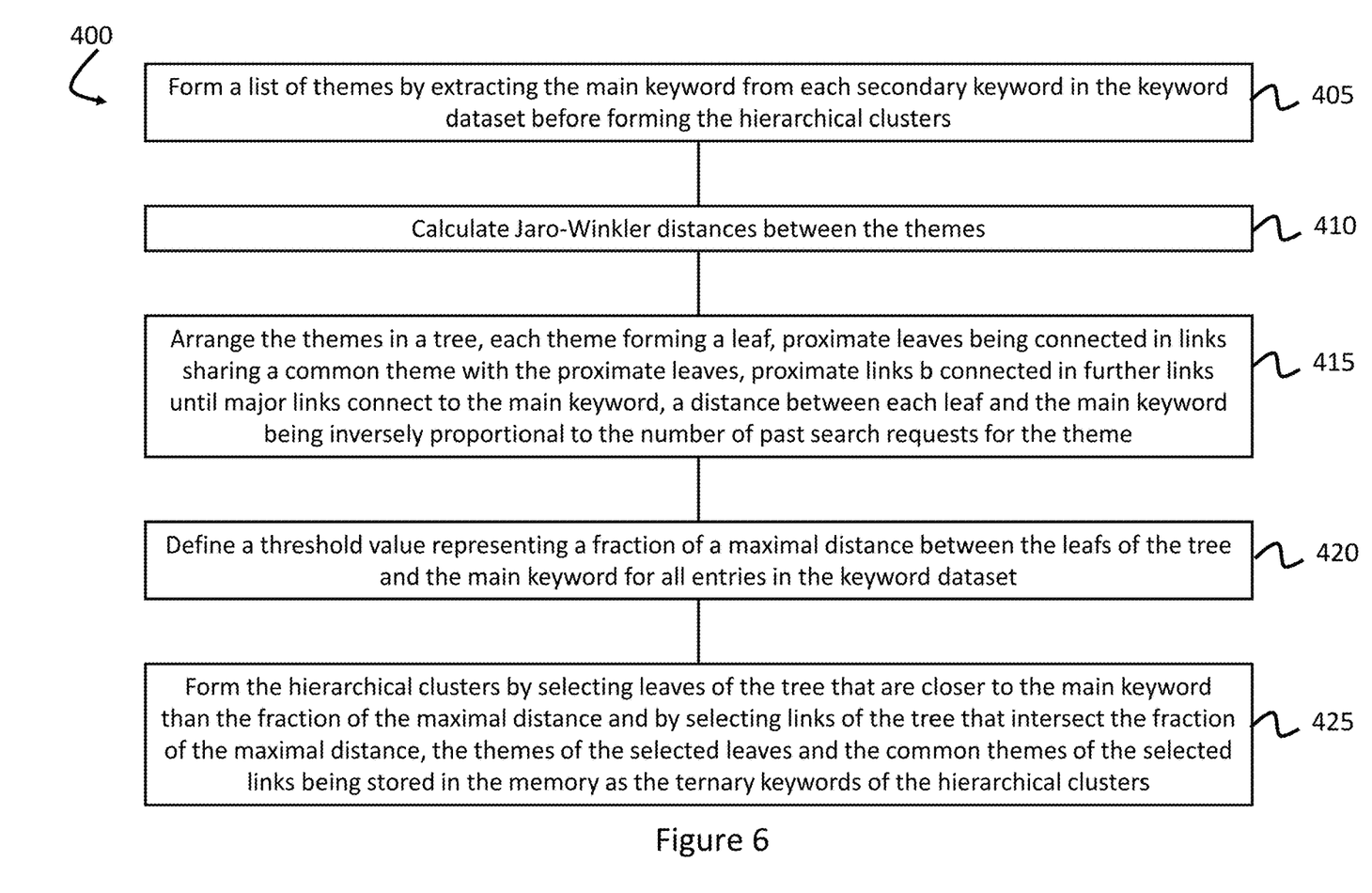
FIG. 6 is a sequence diagram showing operations of a method for defining a web site development strategy in accordance with an embodiment of the present technology.

FIG. 6 is a sequence diagram showing operations of a method for defining a web site development strategy in accordance with an embodiment of the present technology. A sequence 400 comprises a plurality of operations that may be executed in variable order, some of the operations possibly being executed concurrently, some of the operations being optional. The sequence 400 illustrates an embodiment of operation 335 for forming hierarchical clusters. Before actually forming the hierarchical clusters, a list of themes is formed at operation 405 by extracting the main keyword from each secondary keyword in the keyword dataset. Jaro-Winkler distances between the themes are calculated at operation 410. At operation 415, the themes are arranged in a tree. Each theme forms a leaf in the tree. Proximate leaves are connected in links sharing a common theme with the proximate leaves. Proximate links continue being connected in further links until major links connect to the main keyword. A distance between each leaf and the main keyword is inversely proportional to the number of past search requests for the theme. A threshold value representing a fraction of a maximal distance between the leaves of the tree and the main keyword is defined for all entries in the keyword dataset at operation 420. Then, at operation 425, the hierarchical clusters are formed by selecting leaves of the tree that are closer to the main keyword than the fraction of the maximal distance and by selecting links of the tree that intersect the fraction of the maximal distance, the themes of the selected leaves and the common themes of the selected links being stored in the memory as the themes of the hierarchical clusters.

The sequences 300 and 400 may comprise some additional, optional operations and some of the operations of sequences 300 and 400 may comprise additional sub-operations. For example, before operation 335 on FIG. 5 (i.e. before operation 405 on FIG. 6), the keyword dataset may be cleaned up in various manners in order to facilitate the formation of the hierarchical clusters. Any duplicate keyword may be removed from the keyword dataset. A list of unwanted terms stored in the memory of the server 110 may be consulted to remove these terms from the keyword dataset. Any space, punctuation mark, grammatical article and stop word may be deleted from the keyword dataset. In languages where this may be applicable, letters having a diacritical mark may be replaced with a corresponding unmarked character for each relevant entry of the keyword dataset. A stemming operation of one of more entries in the keyword data set may be performing, the stemming operation comprising one or more of converting a word from its plural form to its singular form, removing grammatical gender of a word, or changing a verb to its infinite form.

Figure 7:
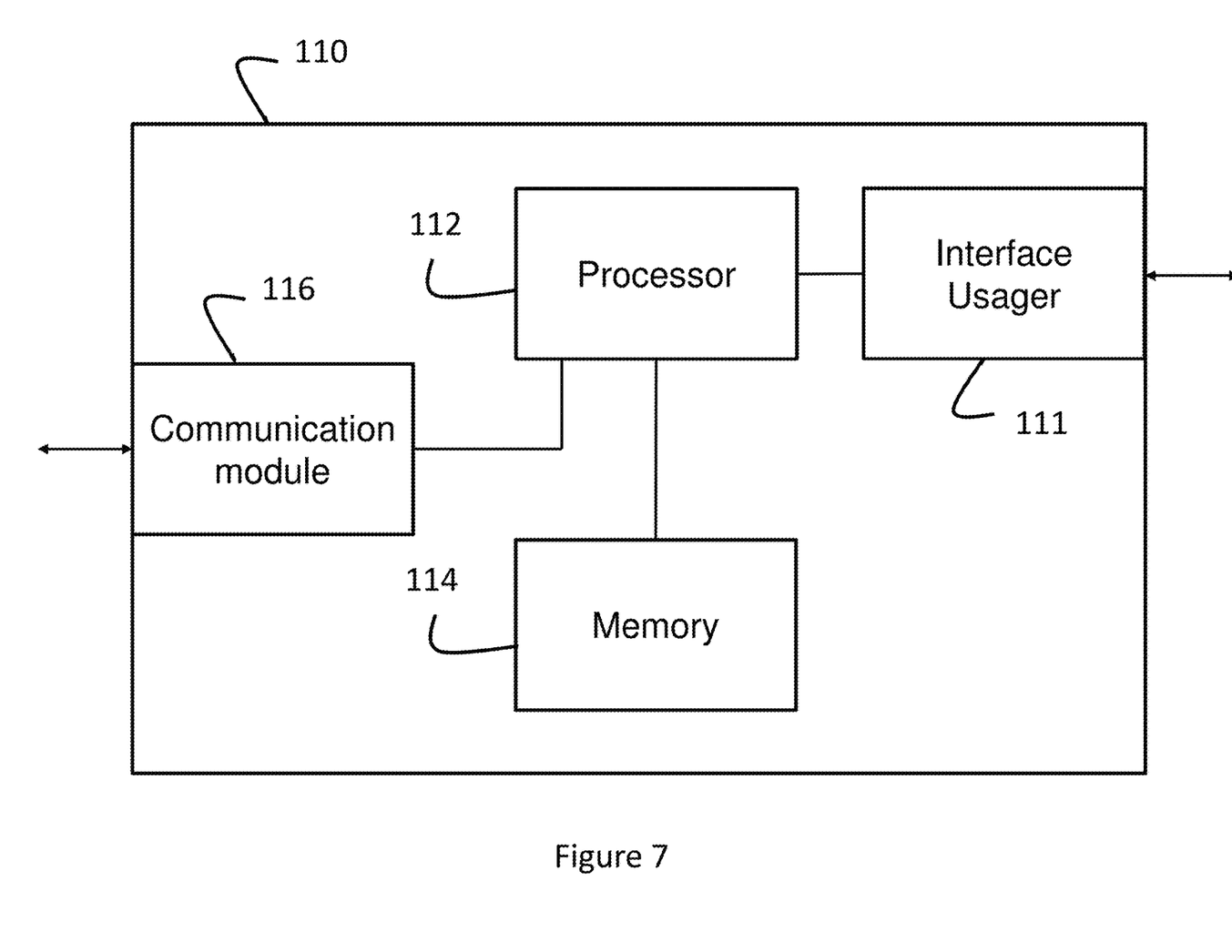
FIG. 7 is a block diagram of a server in accordance with an embodiment of the present technology.

Each of operation of the sequences 300 and 400 may be configured to be processed by one or more processors, the one or more processors being coupled to a memory. For example, FIG. 7 is a block diagram of the server 110 in accordance with an embodiment of the present technology. The server 110 comprises the user interface 111 introduced in the foregoing description of FIG. 1, a processor 112 operatively connected to a memory 114 and to a communication module 116. The communication module 116 is configured for communicating, via the Internet 150, with other network nodes such as the search analytics provider, the search engine 130 and the Internet users 140. In a variant, the communication module 116 may also communicate via the Internet 150 with a remote user interface, including for example a computer display and a mouse, a touch sensitive display, and the like, for the benefit of the web site owner. The communication module 116 may be realized as distinct output and input modules for respectively sending and receiving messages over the Internet 150. The memory 114 is adapted to store the contents of the keyword dataset 180 at the request of the processor 112.

In an embodiment, the processor 112 stores, in the memory, a main keyword for the web site. The processor 112 causes the communication module 116 to send a query server to the search analytics provider 120, the query carrying the main keyword. The processor 112 receives, from the search analytics provider 120, via the communication module 116, a first response carrying a first plurality of secondary keywords and a corresponding number of past search requests for each secondary keyword. Then for each given keyword of the first plurality of secondary keywords, the processor 112 causes the communication module 116 to send a secondary query to the search analytics provider 120, the secondary query carrying the given keyword, the processor 112 then receiving, from the search analytics provider 120 via the communication module 116, a secondary response carrying a second plurality of secondary keywords and a corresponding number of past search requests for each secondary keyword. The processor 112 stores a keyword dataset in the memory 114, each entry of the keyword dataset comprising a distinct secondary keyword associated with its corresponding number of past search requests. The processor 112 forms hierarchical clusters of analogous keywords in the keyword dataset 180, each hierarchical cluster comprising a theme representing a group of analogous secondary keywords and a sum of the numbers of past search requests corresponding to the secondary keywords of the group. The processor 112 stores the hierarchical clusters in the keyword dataset, within the memory 114. The processor 114 outputs a list of the themes to the user interface 111 as a recommendation for populating the web site by creating a web page corresponding to each theme. Alternatively, the processor 114 may cause the communication module 116 to output the list of the themes to a remote user interface.

In a variant, the memory 114 may further comprise a non-transitory computer-readable medium storing executable code thereon. The processor 112 may run instructions contained in the executable code to execute the operations of the sequences 300 and 400.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for defining a web site development strategy for a web site owner, comprising:
    defining, by the web site owner and at a user interface of a server, a main keyword for a web site;
    storing the main keyword in a memory of the server;
    sending a query, from the server to a search analytics provider, the query carrying the main keyword;
    receiving, at the server from the search analytics provider, a first response carrying a first plurality of secondary keywords and a corresponding number of past search requests for each secondary keyword;
    for each given keyword of the first plurality of secondary keywords:
        sending a secondary query, from the server to the search analytics provider, the secondary query carrying the given keyword, and
        receiving, at the server from the search analytics provider, a secondary response carrying a second plurality of secondary keywords and a corresponding number of past search requests for each secondary keyword;
    storing a keyword dataset in the memory of the server, each entry of the keyword dataset comprising a distinct secondary keyword from the first plurality of secondary keywords or the second plurality of secondary keywords, wherein each distinct secondary keyword is associated with its corresponding number of past search requests;
    at the server, forming hierarchical clusters in the keyword dataset, each hierarchical cluster comprising:
        a theme representing a group of analogous secondary keywords, and
        a sum of the numbers of past search requests corresponding to the secondary keywords of the group; and
    outputting, on the user interface of the server, a recommendation for the web site owner to create a web page corresponding to each theme, wherein the recommendation comprises a list of the themes.

2. The method of claim 1, further comprising removing any duplicate keyword from the keyword dataset before forming the hierarchical clusters.

3. The method of claim 1, further comprising:
    storing a list of unwanted terms in a memory of the server;
    searching in the keyword dataset for the unwanted terms of the list; and
    for each entry of the keyword dataset where one of the unwanted terms is found,
        deleting the one of the unwanted terms from the entry before forming the hierarchical clusters.

4. The method of claim 1, further comprising:
    storing a list of unwanted terms in a memory of the server;

searching in the keyword dataset for the unwanted terms of the list; and deleting each entry of the keyword dataset containing one of the unwanted terms before forming the hierarchical clusters.

5. The method of claim 1, further comprising forming a list of themes by extracting the main keyword from each secondary keyword in the keyword dataset before forming the hierarchical clusters.

6. The method of claim 5, further comprising removing any space, punctuation marks, grammatical article and stop word from the keyword dataset before forming the hierarchical clusters.

7. The method of claim 5, further comprising replacing, in each entry of the keyword dataset, letters having a diacritical mark with a corresponding unmarked character.

8. The method of claim 5, further comprising performing a stemming operation of one or more entries in the keyword data set, the stemming operation being selected from converting a word from its plural form to its singular form, removing grammatical gender of a word, changing a verb to its infinite form, and a combination thereof.

9. The method of claim 5, further comprising:
calculating Jaro-Winkler distances between the themes; and
arranging the themes in a tree wherein each theme forms a leaf, proximate leaves are connected in links sharing a common theme with the proximate leaves, proximate links are connected in further links until major links connect to the main keyword, a distance between each leaf and the main keyword being inversely proportional to the number of past search requests for the theme.

10. The method of claim 9, further comprising:
defining a threshold value representing a fraction of a maximal distance between the leafs of the tree and the main keyword for all entries in the keyword dataset;
wherein the hierarchical clusters are formed by selecting leaves of the tree that are closer to the main keyword than the fraction of the maximal distance and by selecting links of the tree that intersect the fraction of the maximal distance, the themes of the selected leaves and the common themes of the selected links being stored in the memory as the themes of the hierarchical clusters.

11. The method of claim 1, further comprising, for each hierarchical cluster:
sending a query, from the server to a search engine, the query requesting a list of all keywords that point to the web site at the search engine; and
receiving, at the server from the search engine, a response carrying the requested list of keywords along with key performance indicators (KPI) for each keyword, the KPIs for each keyword including a rank given by the search engine to the web site hosted by the server and a click through rate.

12. The method of claim 11, wherein a null rank is given by the search engine to a theme that is not found in any web page of the web site.

13. The method of claim 11, wherein outputting the list of themes further comprises outputting, for each theme, the corresponding rank and a search traffic volume for the theme.

14. The method of claim 13, wherein the search traffic volume for the theme is a number of search requests made at the search engine over a period of time.

15. The method of claim 13, wherein the search traffic volume for the theme is a number of search requests made at the search engine over a period of time in a country or in a state.

16. The method of claim 13, wherein outputting the recommendation further comprises outputting, for each theme, a page type, a comment, an expected number of visits to the web site per predetermined time period, and a value representing an expected business income for a web page containing the theme.

17. The method of claim 1, wherein the main keyword, the secondary keywords, the themes and the theme each comprises one or more words.

18. The method of claim 1, wherein one or more of the secondary keywords includes the primary keyword or a synonym of the primary keyword.

19. The method of claim 1, wherein the method is repeated at regular intervals.

20. A server, comprising:
a communication module adapted for communicating with other network nodes over the Internet;
a memory storing executable instructions; and
a processor that, upon executing the executable instructions, causes the server to perform:
receiving, via a user interface, and from a web site owner, a main keyword for a web site;
storing, in the memory, the main keyword for the web site;
causing the communication module to send a query server to a search analytics provider, the query carrying the main keyword;
receiving, from the search analytics provider via the communication module, a first response carrying a first plurality of secondary keywords and a corresponding number of past search requests for each secondary keyword;
for each given keyword of the first plurality of secondary keywords:
causing the communication module to send a secondary query to the search analytics provider, the secondary query carrying the given keyword, and
receiving, from the search analytics provider via the communication module, a secondary response carrying a second plurality of secondary keywords and a corresponding number of past search requests for each secondary keyword;
storing a keyword dataset in the memory, each entry of the keyword dataset comprising a distinct secondary keyword from the first plurality of secondary keywords or the second plurality of secondary keywords, wherein each distinct secondary keyword is associated with its corresponding number of past search requests;
forming hierarchical clusters in the keyword dataset, each hierarchical cluster comprising:
a theme representing a group of analogous secondary keywords, and
a sum of the numbers of past search requests corresponding to the secondary keywords of the group;
storing the hierarchical clusters in the keyword dataset; and
outputting, via the user interface, a recommendation for the web site owner to create a web page corresponding to each theme, wherein the recommendation comprises a list of the themes.

* * * * *